UNITED STATES PATENT OFFICE.

HENRY BLUMENBERG, JR., OF NEW YORK, N. Y.

COMPOUND FOR BATTERY SOLUTIONS.

SPECIFICATION forming part of Letters Patent No. 626,046, dated May 30, 1899.

Application filed February 10, 1899. Serial No. 705,192. (No specimens.)

*To all whom it may concern:*

Be it known that I, HENRY BLUMENBERG, Jr., a citizen of the United States, residing at New York, (Wakefield,) in the borough of Bronx, county of Westchester, and State of New York, have invented an Improvement in Compounds for Battery Solutions, of which the following is a specification.

In my application, Serial No. 688,850, filed August 18, 1898, for battery solution bisulfate of an alkali or alkaline-earth metal is described in connection with a tersulfate of alumina, and in my application, Serial No. 691,133, filed September 17, 1898, chlorate of an alkali or alkaline-earth metal is described in connection with a bisulfate of an alkali or alkaline-earth metal. With the latter materials it is advantageous to employ a porous cup to prevent a too-violent operation, and in the materials described in the application Serial No. 688,850 the reactions are not always sufficiently rapid and strong for some operations, especially where zinc-carbon electrodes are employed.
In the present invention I find that by the use of aluminium sulfate with a chlorate and a bisulfate of an alkali or alkaline-earth metal the action of the solution is more regular and progressive and no porous cup is required, and the solution is a medium between the solutions in the aforesaid applications, and hence is adapted to batteries, especially open-circuit batteries, that are brought into action periodically.
I have discovered that the following composition for a battery solution is available especially for the various zinc-carbon-type cells that are now so universally used for all kinds of open-circuit work. It gives a higher electromotive force. The zincs always keep clean. Furthermore, it does not polarize as quickly as the sal-ammoniac solution, it contains no creeping salts, and does not attack or tarnish the connections as much as the sal-ammoniac solution. Furthermore, the salt is not so bulky and will not crystallize in the bottom of the glass jar if it is not all dissolved.

This solution that I have found to give such excellent results is one consisting of aluminium sulfate, bisulfate of soda, and chlorate of soda. The proportions are to be varied according to the conditions of the work required.

I find that the aluminium sulfate can be used in the form of a double sulfate of aluminium with the metals of the alkalies or alkaline earths called in the common term of "alums." The bisulfate of soda can be replaced by any other bisulfate of the metals of the alkalies or alkaline earths, and, furthermore, the chlorate of soda can also be replaced by any other chlorate of the metals of the alkalies or alkaline earths.

I claim as my invention—

1. A compound for a battery solution, consisting of a sulfate of aluminium, bisulfate of the metals of the alkalies, or alkaline earths, and a chlorate of the metals of the alkalies or alkaline earths, substantially as set forth.

2. A battery solution containing sulfate of aluminium, chlorate of soda and bisulfate of soda, substantially as set forth.

3. A battery compound consisting of sulfate of aluminium, as contained in the sulfates of ammonia, potash or soda alums, a bisulfate of the metals of the alkalies or alkaline earths and a chlorate of the metals of the alkalies or alkaline earths, substantially as set forth.

Signed by me this 9th day of February, 1899.

HENRY BLUMENBERG, JR.

Witnesses:
 GEO. T. PINCKNEY,
 S. T. HAVILAND.